United States Patent Office 2,830,031
Patented Apr. 8, 1958

2,830,031

COMPOSITIONS COMPRISING EPOXY COMPOUNDS AND HYDROXY TERMINATED POLYESTER RESINS AND PROCESS OF MAKING SAME

Willy Fisch, Binningen, Switzerland, assignor to Ciba Limited, Basel, Switzerland, a Swiss firm No Drawing. Application June 27, 1955
Serial No. 518,366

Claims priority, application Switzerland August 12, 1949

8 Claims. (Cl. 260—45.4)

It is known that compounds which contain at least two epoxide groups per mol can be converted into infusible artificial resins by means of cross-linking agents, such for example as polycarboxylic anhydrides, hardening taking place practically without the formation of volatile by-products and with only very slight shrinkage. Owing to their mechanical properties and chemical resistance such products are of considerable interest as cast products, lacquers or adhesives, especially for metals. As cross-linking agents there have been used only compounds in which the distance between the groups capable of reacting with epoxide groups is small.

However, in addition to their good properties for certain purposes the products so obtained have the disadvantage that they are not sufficiently extensible and elastic.

The present invention is based on the observation that valuable artificial masses can be made by mixing a compound containing more than one epoxide group per mol with a cross-linking agent, and if desired, a catalyst, provided that certain requirements are observed. These requirements are that the linking agent used must be a compound containing at least two groups capable of reacting with epoxide groups, and at least two of these reactive groups must be separated from one another by a chain of at least 10, preferably at least 14, and advantageously at least 24, members. The artificial masses so obtained can be converted by heat, if desired, with the aid of catalysts, into useful artificial products.

Thus, depending on the nature of the artificial mass and on the manner in which it is treated, there can be obtained as an intermediate stage fusible and inelastic artificial products, which can be converted by further treatment at a later stage into fusible and elastic products, and especially into infusible final products of surprising elasticity. Obviously, such final products can be obtained in one operation from the artificial masses. The degree of elasticity can be varied within wide limits. It depends on the quantity of the cross-linking agent used, on the number and nature of the members between the active groups in the cross-linking agent and also on the distance apart of the epoxide groups in the compound containing such groups. The elasticity can also be strongly influenced by using, in addition to a cross-linking agent in which a chain of at least 10 members separates the reactive groups, one in which those groups are separated by a chain having less than 10 members. In general, in this manner the modulus of elasticity is increased and the length to which this material can be drawn out before breaking reduced.

As groups, hereinafter also referred to as active groups, capable of reacting with epoxide groups, there may be used principally groups containing active hydrogen, for example, radicals of acid or alkaline action, such as carboxyl, or amino or amide or imino or imide groups. The acid groups may be present in the form of anhydrides or in another form which is easily convertible into the free acid. However, there may also be used aliphatic hydroxyl-groups generally requiring more extreme reaction conditions such as a higher temperature or the use of catalysts.

This application is particularly concerned with the employment of aliphatic compounds containing two terminal hydroxyl groups which are separated from one another by a chain of at least 14 members, for example, polyesters and polyglycols having such terminal hydroxyl groups.

The active groups of the cross-linking agent may be bound together by a very wide variety of different kinds of members, such as

or aliphatic, aromatic or heterocyclic rings etc.. Rigid rings such, for example, as benzene rings, are reckoned as one member.

As cross-linking agents which are compounds containing at least two groups capable of reacting with epoxide groups, at least two of these reactive groups being separated by a chain of at least 10 members, there are to be understood herein the following products which are known in the literature or can be made by the ordinary methods:

I. Unitary compounds.

II. Mixtures, for example, polyesters or polyamides, such as are obtained, for example, by reacting polyhydric alcohols, advantageously di-alcohols, or polyamines, advantageously diamines, with polycarboxylic acids, advantageously dicarboxylic acids, or their anhydrides, and III. Mixtures of cross-linking agents, of which the reactive groups are separated from one another by a chain of less than 10 members, for example, triethylene tetramine or phthalic anhydride, with compounds or mixtures as mentioned under I or II above.

Especially suitable as cross-linking agents are long chain polyesters containing active groups. These can be obtained in a very simple manner by heating dicarboxylic acids with dialcohols, the length of the chain and also the nature of the end groups depending on the molecular ratio of the starting materials.

In polyesters so obtained other active groups may be subsequently introduced, or active groups which are already present may be converted into other active groups. Thus, for example, in the case of a long chain polyester having end carboxyl groups, the latter may be converted into the corresponding amide groups.

Cross-linking agents may also be formed in the presence of compounds containing epoxide groups, whereby the new artificial products can be obtained in one operation.

As compounds containing more than one epoxide group per mol there are to be understood not only chemical unitary compounds but also mixtures of compounds containing epoxide groups such, for example, as are obtained in known manner by reacting mononuclear or poly-nuclear polyphenols advantageously diphenols, with epichlorhydrin or dichlorhydrin in the presence of an aqueous alkali, whereby, depending on the molecular ratio of the components used, mixtures of different polyethers having chains of different lengths and epoxide groups predominantly in end positions and, if desired, intermediately placed hydroxyl groups, for example, of the following constitution:

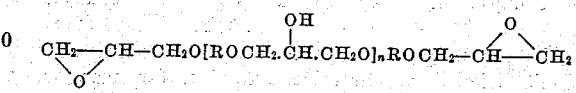

in which the atomic grouping ORO may represent, for example, the radical of a so-called diphenol, that is to say, for example, a compound of the type of 4:4'-dihydroxydiphenyl-dimethyl-methane, or resorcinol.

Aliphatic alcohols and epichlorhydrin can also be converted into chlorhydrin ethers with the aid of condensing agents such as boron trifluoride, which chlorhydrin ethers change into compounds containing epoxide groups by the elimination of hydrogen chloride by means of an agent of alkaline reaction. Furthermore, it is possible to obtain substances containing epoxide groups by treating compounds containing olefinic double bonds with oxidizing agents, for example perbenzoic acid or with hypochlorite.

It is of advantage to use starting materials containing epoxide groups in which there is a certain distance between at least two of the epoxide groups. The epoxide groups may be connected to one another in various ways. Generally speaking, it can be said that when the active groups of the cross-linking agent are relatively far apart the distance between the epoxide groups may be smaller.

In order to produce artificial masses, which can be converted by heat and if desired with the aid of catalyst into hardened elastic artificial products, the compounds containing epoxide groups are mixed with the cross-linking agents and if desired, with catalysts. If the starting materials are liquid the mixture may be produced at room temperature, and if one or both of them are solid, the mixing is best conducted with the aid of heat in the form of a liquid melt. The use of high temperatures may also be of advantage when the starting materials are not easily compatible with one another. The mixture is then treated at a raised temperature until a clear melt is obtained.

Mixing may also be carried out in the presence of solvents, and in this manner, depending on the choice of the solvents, lacquers can be obtained ready for use, which yield elastic coatings.

However, it is also possible to obtain artificial masses which withstand storage and are liquid or at least thickly liquid at room temperature, and which can be used without any solvent at ordinary temperature, for example, for coating or casting, and which after application can be converted, for example, by heat treatment into the hardened and elastic state.

In this case the aforesaid products constitute solvent-free lacquers and may also be used for adhesively uniting a very wide variety of materials, especially metals, as such or on other substrata.

The new products represent a considerable advance, for example, in the art of making cast products. Hitherto it has indeed been possible to produce large hardened bubble-free cast products with the aid of compounds containing epoxide groups. However, it has always been difficult to enclose large articles such as metal parts by casting resins, such as is frequently required, for example, in the case of electrical apparatus, because strains subsequently occur due to the difference between the coefficients of thermal expansion of resin and metal. These difficulties are overcome by means of the new elastic products even in the hardened condition, since an enclosure covering a large metal core and composed of the new artificial product exhibits no fissures even after a long time.

The relative proportions by weight of the cross-linking agent and the compound containing epoxide groups may vary within very wide limits. Advantageously the cross-linking of the compound containing epoxide groups is brought about with a proportion of the cross-linking agent such as contains in the active groups a number of active hydrogen atoms approximately corresponding to the number of epoxide groups present.

As catalysts there may be used basic and acid catalysts such as are in themselves known. Especially suitable are, nitrogenous substances such as amides or amines, for example, triethylene tetramine and also, for example, sodium hydroxide or sulfuric acid. There may also be used substances of the type of Friedel-Crafts catalysts, for example, boron trifluoride. There are also cross-linking agents which act simultaneously as catalysts such, for example, as triethylene tetramine mentioned above and polyesters containing tertiary nitrogen atoms, for example, a polyester obtained from adipic acid and ethyl-diethanolamine, or from sebacic acid and triethanolamine.

The hardenable artificial masses or their components may be mixed at any stage prior to hardening with filling materials, softening agents, coloring substances etc. The invention also includes the possiblity that a part of the cross-linking agent, especially when it is used in large quantities, does not react completely and therefore acts as a softening agent.

The terms "hardenable" and "harden" are used herein not in a mechanical sense but with reference to the chemical properties or reactions. Those terms denote the capacity for conversion and the actual conversion, respectively, from a soluble and fusible condition into an insoluble and infusible condition. Accordingly, chemical hardening may lead to products which are mechanically very soft.

The following examples illustrate the invention, the parts being by weight:

*Example 1*

438 parts of adipic acid (3 mols) and 248 parts of glycol (4 mols) are heated together up to 210° C. The resulting polyester contains 3.4 mols of end hydroxyl groups per kilogram. It is therefore a dialcohol having about 32 members in the chain.

In order to prepare a product containing epoxide groups 228 parts of dihydroxy-diphenyl-dimethyl methane (1 mol) are reacted with 148 parts of epichlorhydrin (1.6 mol) and an aqueous solution of caustic soda, and the product is washed and dried. A brittle resin is obtained which contains about 2.4 epoxide equivalents per kilogram.

By melting 1 part of the above epoxy compound with 0.8 part of the aforesaid dialcohol at about 100° C., and treating the mixture for 16 hours, at 165° C., practically no change occurs. The product is also still fluid at room temperature. However, by heating the mixture for 16 hours at 220° C. a bubble-free rubber-like cast product is obtained.

The reaction can be accelerated with the aid of phthalic anhydride as a cross-linking agent having in the chain less than 10 members, products with varying degrees of elasticity being obtained depending on the quantity of the phthalic anhydride, as explained below:

Separate portions of 1 part each of the above mixture are mixed with 0.14, 0.17, 0.21, 0.25 and 0.31 part of phthalic anhydride, and heated for 16 hours at 165° C. In all cases there are obtained cast products which at the beginning of the series are still soft but towards the end of the series are rather hard.

The phthalic anhydride may here react in two different ways. Firstly, it may react with the two end hydroxyl groups of the polyester, whereby a long chain dicarboxylic acid is formed, which as a multi-membered cross-linking agent enters into reaction with the epoxycompound. However, it is also possible that it enters into reaction directly with the epoxide groups or with any hydroxyl groups present in the epoxy compound.

Cross-linking when hydroxyl groups are used as active groups can also be accelerated by means of catalysts. For example, by mixing 1 part of the molten polyester with 0.006 part of a solution of 32 percent strength of boron trifluoride in anisole, melting the mixture with 1 part of the above epoxy compound, and hardening at 160° C., the mass gelatinizes even after ½ hour and there is obtained after a few hours a clear, soft, elastic molding. If there is used instead of boron trifluoride, 0.01 part of concentrated sulfuric acid gelatinization occurs at about 160° C. after 1½ hours. After 2–2½ hours there is likewise obtained a clear pale cast product, but with longer hardening periods the product begins to become colored.

By mixing 1 part of the above described polyester from adipic acid and glycol with 0.1 part of an ethyl alcoholic solution of 10 percent strength of sodium hydroxide and evaporating the alcohol at a high temperature, there is obtained a neutral mass which contains 1 percent of sodium hydroxide in the form of the sodium salt of hydrolyzed ester groups of the polyester. By melting the resulting mass with 1.4 parts of the above epoxy compound and hardening at about 140 or 160° C., gelatinization occurs after 1¾ or ¾ of an hour, respectively. After a total hardening period of 2½ or 1½ hours, respectively, the reaction is complete, whereby very slightly turbid, very soft, rubber-like cast products are obtained.

*Example 2*

In a manner analogous to that described in the second paragraph of Example 1 there is obtained from epichlorhydrin and dihydroxy-diphenyl-dimethyl methane an epoxy compound. By using a large excess of epichlorhydrin, e. g. five mols epichlorhydrin to one mol epoxy compound, it is possible to obtain a still liquid product of relatively low molecular weight, which contains 5.1 epoxide equivalents per kilogram.

Separate portions of a mixture of 59 parts (1 mol) of the above epoxy resin and 46 parts (2 mols) of hexahydrophthalic acid anhydride are mixed with 43 (0.7 mol), 54 (0.9 mol) and 65 parts (1.1 mols) of polypropyleneglycol of an average molecular weight of 400 corresponding to a chain length of about 20. The mixtures are heated for 16 hours at a temperature of 160° C. The resulting products give hard-elastic or soft-elastic rubber-like products with a Shore-hardness (Durometer A, ASTM D 676–49 T) of 84, 43 and 20, respectively.

By using 39 parts (1 mol) of the above epoxy resin, 30 parts (2 mols) phthalic acid anhydride and 34 (0.5 mol), 51 (0.7 mol) or 68 parts (0.9 mol) of polypropyleneglycol of an average molecular weight of 750 corresponding to a chain length of about 38, products with a Shore-hardness of 84, 28 and 3, respectively, are obtained.

This application is a continuation-in-part of my application Serial No. 177,774, filed August 4, 1950, now Patent No. 2,712,535.

What I claim is:

1. A process for the manufacture of an elastic artificial product which consists essentially of reacting, with heat, a compound containing more than one 1,2-epoxide group per mol with a proportion of cross-linking agent such as contains in the active groups a number of active hydrogen atoms approximately corresponding to the number of epoxide groups present, said cross-linking agent being an aliphatic polyester obtained by reaction of aliphatic dicarboxylic acids and polyhydric alcohols containing two terminal hydroxyl groups, which are separated from one another by a chain of at least 14 members, and the reaction with heat being carried out to a point where the reaction mass becomes infusible, whereby an elastic product is obtained, said elastic product containing said chain of at least 14 members intact.

2. A process for the manufacture of an elastic artificial product which consists essentially of reacting, with heat, a compound containing more than one 1,2-epoxide group per mol, with a proportion of cross-linking agent such as contains in the active groups a number of active hydrogen atoms approximately corresponding to the number of epoxide groups present, said cross-linking agent being an aliphatic polyester obtained by reaction of aliphatic dicarboxylic acids and polyhydric alcohols containing two terminal hydroxyl groups, which are separated from one another by a chain of at least 14 members, and the reaction with heat being carried out in the presence of phthalic anhydride in an amount of about 0.14 to about 0.31 part of phthalic anhydride per part of epoxide compound and cross-linking agent mixture to a point where the reaction mass becomes infusible, whereby an elastic product is obtained, said elastic product containing said chain of at least 14 members intact.

3. A process for the manufacture of an elastic artificial product which consists essentially of reacting, with heat, a compound containing more than one 1,2-epoxide group per mol with a proportion of cross-linking agent such as contains in the active groups a number of active hydrogen atoms approximately corresponding to the number of epoxide groups present, said cross-linking agent being an aliphatic polyester, obtained by reaction of aliphatic dicarboxylic acids and polyhydric alcohols, containing two terminal hydroxyl groups, which are separated from one another by a chain of at least 14 members, and the reaction with heat being carried out in the presence of a catalyst to a point where the reaction mass becomes infusible, whereby an elastic product is obtained, said elastic product containing said chain of at least 14 members intact.

4. A process for the manufacture of an elastic artificial product which consists essentially of reacting, with heat, a compound containing more than one 1,2-epoxide group per mol with a proportion of cross-linking agent such as contains in the active groups a number of active hydrogen atoms approximately corresponding to the number of epoxide groups present, said cross-linking agent being an aliphatic polyester, obtained by reaction of aliphatic dicarboxylic acids and polyhydric alcohols, containing two terminal hydroxyl groups, which are separated from one another by a chain of at least 14 members, and the reaction with heat being carried out in the presence of phthalic anhydride in an amount of about 0.14 to about 0.31 part of phthalic anhydride per part of epoxide compound and cross-linking agent mixture and in the presence of a catalyst to a point where the reaction mass becomes infusible, whereby an elastic product is obtained, said elastic product containing said chain of at least 14 members intact.

5. An elastic infusible product, which consists essentially of the reaction product of a compound containing more than one 1,2-epoxide group per mol with a proportion of cross-linking agent such as contains in the active groups a number of active hydrogen atoms approximately corresponding to the number of epoxide groups present, said cross-linking agent being an aliphatic polyester, obtained by reaction of aliphatic dicarboxylic acids and polyhydric alcohols, containing two terminal hydroxyl groups, which are separated from one another by a chain of at least 14 members, said elastic product containing said chain of at least 14 members intact.

6. An elastic infusible product, which consists essentially of the reaction product of a compound containing more than one 1,2-epoxide group per mol with a proportion of cross-linking agent such as contains in the active groups a number of active hydrogen atoms approximately corresponding to the number of epoxide groups present, said cross-linking agent being a mixture of aliphatic polyesters, obtained by reaction of aliphatic dicarboxylic acids and polyhydric alcohols, containing two terminal hydroxyl groups, which are separated from one another by a chain of at least 14 members, and of phthalic anhydride in an amount of about 0.14 to about 0.31 part of phthalic anhydride per part of epoxide compound and cross-linking agent mixture, said elastic product containing said chain of at least 14 members intact.

7. A composition of matter capable of forming an elastic infusible reaction product, which consists essentially of a hardenable epoxide compound, containing more than one 1,2-epoxide group per mol and a proportion of cross-linking agent such as contains in the active groups a number of active hydrogen atoms approximately corresponding to the number of epoxide groups present, said cross-linking agent being an aliphatic polyester, obtained by reaction of aliphatic dicarboxylic acids and polyhydric alcohols, containing two terminal hydroxyl groups, which are separated from one another by a chain of at least 14 members, said elastic product containing said chain of at least 14 members intact.

8. A composition of matter capable of forming an elastic infusible reaction product, which consists essentially of a hardenable 1,2-epoxide compound, containing more than one epoxide group per mol and a proportion of cross-linking agent such as contains in the active groups a number of active hydrogen atoms approximately corresponding to the number of epoxide groups present, said cross-linking agent being a mixture of an aliphatic polyester, obtained by reaction of aliphatic dicarboxylic acids and polyhydric alcohols, containing two terminal hydroxyl groups, which are separated from one another by a chain of at least 14 members, and of phthalic anhydride in an amount of about 0.14 to about 0.31 part of phthalic anhydride per part of epoxide compound and cross-linking agent mixture, said elastic product containing said chain of at least 14 members intact.

References Cited in the file of this patent

UNITED STATES PATENTS

| | | |
|---|---|---|
| 2,528,932 | Wiles et al. | Nov. 7, 1950 |
| 2,731,444 | Greenlee | Jan. 17, 1956 |

FOREIGN PATENTS

| | | |
|---|---|---|
| 284,090 | Switzerland | Nov. 17, 1952 |

OTHER REFERENCES

"Synthetic Organic Chemicals," 13th edition, Carbide and Carbon Chemicals Co., New York, 1952, page 50.